(12) United States Patent
Kwon et al.

(10) Patent No.: US 11,984,750 B2
(45) Date of Patent: May 14, 2024

(54) BATTERY MANAGEMENT SYSTEM AND BATTERY MANAGEMENT METHOD

(71) Applicant: LG ENERGY SOLUTION, LTD., Seoul (KR)

(72) Inventors: Jung Hyun Kwon, Daejeon (KR); Chan Ha Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 387 days.

(21) Appl. No.: 17/606,972

(22) PCT Filed: Apr. 3, 2020

(86) PCT No.: PCT/KR2020/004572
§ 371 (c)(1),
(2) Date: Oct. 27, 2021

(87) PCT Pub. No.: WO2020/256258
PCT Pub. Date: Dec. 14, 2020

(65) Prior Publication Data
US 2022/0376537 A1    Nov. 24, 2022

(30) Foreign Application Priority Data

Jun. 18, 2019  (KR) .......................... 10-2019-0072374

(51) Int. Cl.
*H02J 7/00* (2006.01)
*H01M 10/42* (2006.01)

(52) U.S. Cl.
CPC ....... *H02J 7/0071* (2020.01); *H01M 10/4207* (2013.01); *H01M 10/425* (2013.01);
(Continued)

(58) Field of Classification Search
CPC .................................................. H02J 7/0071
(Continued)

(56) References Cited

U.S. PATENT DOCUMENTS

| 5,107,420 A | 4/1992 | Kametani |
| 8,129,950 B2 | 3/2012 | Colin et al. |

(Continued)

FOREIGN PATENT DOCUMENTS

| CN | 101895133 A | 11/2010 |
| CN | 104880605 A | 9/2015 |

(Continued)

OTHER PUBLICATIONS

International Search Report issued in corresponding International Patent Application No. PCT/KR2020/004572 dated Jul. 10, 2020.

(Continued)

*Primary Examiner* — Yalkew Fantu
(74) *Attorney, Agent, or Firm* — Morgan, Lewis & Bockius LLP

(57) ABSTRACT

The present disclosure provides a battery management system including a reception unit configured to receive a start signal and a completion signal of job from another battery management system, a transmission unit configured to transmit the start signal and the completion signal of job by broadcast, a storage unit configured to store a time table including a job code of a plurality of jobs to be executed, a priority of corresponding job, and an execution time and period of corresponding job, a synchronization unit configured to execute synchronization of a job execution time using the received start signal or the received completion signal of job and the time table, and a job execution unit configured to execute a job using the time table stored in the storage unit and a time calculated by the synchronization unit.

14 Claims, 7 Drawing Sheets

(52) U.S. Cl.
CPC ........ *H02J 7/00032* (2020.01); *H02J 7/0013* (2013.01); *H01M 2010/4271* (2013.01); *H01M 2010/4278* (2013.01)

(58) Field of Classification Search
USPC .......................................................... 320/135
See application file for complete search history.

(56) References Cited

U.S. PATENT DOCUMENTS

| | | | |
|---|---|---|---|
| 2009/0087722 A1 | 4/2009 | Sakabe et al. | |
| 2009/0243550 A1 | 10/2009 | Arai et al. | |
| 2010/0052615 A1 | 3/2010 | Loncarevic | |
| 2010/0295382 A1 | 11/2010 | Tae et al. | |
| 2012/0105001 A1* | 5/2012 | Gallegos | B60L 53/66 320/109 |
| 2013/0119946 A1 | 5/2013 | Arai et al. | |
| 2013/0207613 A1 | 8/2013 | Loncarevic | |
| 2015/0026693 A1* | 1/2015 | Satoh | G06F 9/4881 718/103 |
| 2016/0164662 A1* | 6/2016 | Kang | H02J 7/0013 375/356 |
| 2017/0373355 A1* | 12/2017 | Kagawa | H02J 7/0048 |
| 2019/0237816 A1 | 8/2019 | Kim et al. | |
| 2023/0068623 A1 | 3/2023 | Kim et al. | |

FOREIGN PATENT DOCUMENTS

| | | |
|---|---|---|
| EP | 2254189 A1 | 11/2010 |
| JP | 5656571 B2 | 1/2015 |
| JP | 2015-216012 A | 12/2015 |
| JP | WO2015/189898 A1 | 12/2015 |
| JP | 2016-213970 A | 12/2016 |
| JP | 2016-540412 A | 12/2016 |
| JP | 2017-038466 A | 2/2017 |
| JP | 2019-28822 A | 2/2019 |
| KR | 10-2010-0124499 A | 11/2010 |
| KR | 10-1016813 B1 | 2/2011 |
| KR | 10-2012-0063367 A | 6/2012 |
| KR | 10-2014-0072238 A | 6/2014 |
| KR | 10-2015-0044283 A | 4/2015 |
| KR | 10-164088 B1 | 7/2016 |
| KR | 10-1640888 B1 | 7/2016 |
| KR | 10-2017-0062757 A | 6/2017 |
| KR | 10-2017-00627575 A | 6/2017 |
| KR | 10-2018-0079769 A | 7/2018 |
| KR | 10-2019-0009635 A | 1/2019 |
| WO | 2019/017595 A1 | 1/2019 |

OTHER PUBLICATIONS

Office Action dated Oct. 25, 2022, issued by the Japanese Patent Office in corresponding Japanese Patent Application No. 2021-559018.

Office Action dated Jul. 29, 2023, issued in corresponding Chinese Patent Application No. 202080033304.1.

Extended European Search Report dated Jul. 4, 2022 issued by the European Patent Office in corresponding European Patent Application No. 20826533.0.

* cited by examiner

| BMC | PRIORITY | EXECUTION TIME | PERIOD |
|---|---|---|---|
| JOB A | 1 | 50ms | 100ms |
| JOB B | 2 | 10ms | 20ms |
| JOB C | 3 | 5ms | 10ms |

| CMC1 | PRIORITY | EXECUTION TIME | PERIOD |
|---|---|---|---|
| JOB A | 1 | 50ms | 100ms |
| JOB C | 3 | 5ms | 10ms |
| JOB D | 4 | 3ms | 5ms |

| CMC2 | PRIORITY | EXECUTION TIME | PERIOD |
|---|---|---|---|
| JOB A | 1 | 50ms | 100ms |
| JOB B | 2 | 10ms | 20ms |
| JOB D | 4 | 3ms | 5ms |

| CMC3 | PRIORITY | EXECUTION TIME | PERIOD |
|---|---|---|---|
| JOB A | 1 | 50ms | 100ms |
| JOB E | 5 | 20ms | 40ms |
| JOB F | 6 | 15ms | 30ms |

BATTERY MANAGEMENT SYSTEM AND BATTERY MANAGEMENT METHOD

CROSS-REFERENCE TO RELATED APPLICATIONS

This application claims priority to and the benefit of Korean Patent Application No. 10-2019-0072374, filed on Jun. 18, 2019, the entire contents of which are hereby incorporated by reference.

TECHNICAL FIELD

The present invention relates to a battery management system and a management method for efficient job scheduling.

BACKGROUND ART

Recently, research and development on secondary batteries have been actively conducted. Here, the secondary batteries are batteries that can be charged and discharged, and include conventional Ni/Cd batteries and Ni/MH batteries, and recent lithium ion batteries. Among the secondary batteries, the lithium ion battery has an advantage that the energy density is much higher than that of the conventional Ni/Cd battery and Ni/MH battery. Further, the lithium ion battery can be manufactured with a tendency of a small size and a light weight so that it is used as a power source for a mobile apparatus. In addition, the usage range of the lithium ion battery extends as a power source for electric vehicles, so that the lithium ion battery attracts attention as a next generation energy storage medium.

In addition, a secondary battery is generally used as a battery pack including a battery module in which a plurality of battery cells are connected in series and/or in parallel. A state and an operation of such a battery pack are managed and controlled by a battery management system (BMS).

A battery management system composed of a plurality of battery packs may include a master battery management system and a plurality of slave battery management systems. The master battery management system communicates with a high-level system to control the operation of the plurality of slave battery management systems.

In recent years, such a master battery management system and a plurality of slave battery management systems transmit and receive signals wirelessly. However, in relation to wireless communication between the master battery management system and the slave battery management system in the vehicle battery management system, in order to perform precise operations between distant systems, there was a problem in that each system had to synchronize work execution time for each job.

Conventionally, in order to synchronize the execution time of the same job on each system, it was solved by using a Network Time Protocol (NTP) server, but in some cases it was impossible to introduce the NTP server due to the embedded characteristics.

DISCLOSURE OF THE INVENTION

Technical Problem

The object of the present invention is to perform synchronization of the same jobs between respective battery management systems without additional configuration.

Technical Solution

In order to solve the above technical problem, according to one aspect of the embodiments of the present invention, provided is a battery management system including: a reception unit configured to receive a start signal and a completion signal of job from another battery management system; a transmission unit configured to transmit the start signal and the completion signal of job by broadcast; a storage unit configured to store a time table including a job code of a plurality of jobs to be executed, a priority of corresponding job, and an execution time and period of corresponding job; a synchronization unit configured to execute synchronization of a job execution time using the received start signal or the received completion signal of job and the time table; and a job execution unit configured to execute a job using the time table stored in the storage unit and a time calculated by the synchronization unit.

According to other features of these embodiments, when the job is a first job and the reception unit receives the start signal of the first job, when the first job has a higher priority than a currently executing job that is a job executed by the job execution unit based on the time table stored in the storage unit, the synchronization unit allows the job execution unit to stop the currently executing job and execute the first job, and when the first job has a lower priority than the currently executing job, the synchronization unit calculates a next start time of the first job using a time when the start signal of the first job is received and a completion time of the currently executing job so that the execution unit executes the first job at the next start time.

According to other features of these embodiments, when the first job has a lower priority than the currently executing job, a time elapsed by a time, which is calculated by dividing a value obtained by subtracting the time when the start signal of the first job is received from the completion time of the currently executing job by the period of the first job, is the next start time.

According to other features of these embodiments, when the specific job is a first job and the reception unit receives the completion signal, when the first job has a higher priority than the currently executing job that is the job executed by the job execution unit based on the time table stored in the storage unit, the synchronization unit calculates the next start time of the first job using a time when the completion signal of the first job is received, a completion time of the currently executing job, and the execution time and the period of the first job, and allows the execution unit to execute the first job at the next start time, and when the first job has a lower priority than the currently executing job, the synchronization unit calculates the start time of the first job using the difference value between the time when the completion signal of the first job is received and the completion time of the currently executing job and the period of the first job to cause the execution unit to execute the first job at the start time of the first job.

According to other features of these embodiments, when the first job has a higher priority than the currently executing job, the value (c) (=(a)−(b)), which is a value obtained by subtracting (b) that is a value obtained by subtracting the time when the completion signal of the first job is received from the completion time of the currently executing job from (a) that is a value obtained by subtracting the execution time of the first job from the period of the first job, is determined to be a remaining time until the next start time of the first job.

According to other features of these embodiments, when the first job has a lower priority than the currently executing job, by comparing the period of the first job with (d), which is a value obtained by subtracting the time when the completion signal of the first job is received from the completion time of the currently executing job, when (d) is less than the period of the first job, a value obtained by subtracting (d) from the period of the first job represents a time remaining until the start time of the first job, and when (d) is greater than the period of the first job: after obtaining a minimum n value where {the period of the first job−the execution time of the currently executing job+(n−1)×the period of the currently executing job} is greater than (d) (n is a natural number), a value obtained by subtracting (d) from {the period of the first job−the execution time of the currently executing job+(n−1)×the period of the currently executing job} represents a time remaining until the start time of the first job.

According to other features of these embodiments, the battery management system further includes an error calculation unit configured to calculate a reception error of the start signal of the job by comparing a difference between a time when the start signal is received and a time when the completion signal is received and the execution time stored in the time table, after the reception unit receives both the start signal and the completion signal of the job, wherein the synchronization unit reflects the reception error in synchronization.

In order to solve the above technical problem, according to another aspect of the embodiments of the present invention, provided is a battery management method including: receiving a start signal and a completion signal of job; performing synchronization of a job execution time based on the received start signal or the received completion signal of the job, and a time table stored in a storage unit—the time table includes a job code of a plurality of jobs to be executed, a priority of corresponding job, and an execution time and period of corresponding job−; and executing job using the time table and the job execution time calculated from the job execution synchronization.

According to other features of these embodiments, when the job is a first job and the start signal of the first job is received, the performing of the synchronization of the job execution time includes: when the first job has a higher priority than the currently executing job, which is a job that is being executed currently, based on the time table, stopping the currently executing job and executing the first job, and when the first job has a lower priority than the currently executing job based on the time table, calculating a next start time of the first job by using a time when the start signal of the first job is received and a completion time of the currently executing job, to execute the first job at the next start time.

According to other features of these embodiments, when the first job has a lower priority than the currently executing job, a time elapsed by a time, which is calculated by dividing a value obtained by subtracting the time when the start signal of the first job is received from the completion time of the currently executing job by the period of the first job, is a next start time.

According to other features of these embodiments, when the job is a first job and the completion signal of the first job is received, the performing of the synchronization of the job execution time includes, when the first job has a higher priority than the currently executing job that is a job that is being executed current based on the time table, calculating the next start time of the first job using the time when the completion signal of the first job is received, the completion time of the currently executing job, and the execution time and the period of the first job to execute the first job at the next start time, and when the first job has a lower priority than the currently executing job, calculating the start time of the first job using the difference value between the time when the completion signal of the first job is received and the completion time of the currently executing job and the period of the first job to execute the first job at the start time of the first job.

According to other features of these embodiments, when the first job has a higher priority than the currently executing job, the value (c) (=(a)−(b)), which is a value obtained by subtracting (b) that is a value obtained by subtracting the time when a completion signal of the first job is received from the completion time of the currently executing job from (a) that is a value obtained by subtracting the execution time of the first job from the period of the first job, is determined to be a remaining time until the next start time of the first job.

According to other features of these embodiments, when the first job has a lower priority than the currently executing job, by comparing the period of the first job with (d), which is a value obtained by subtracting the time when the completion signal of the first job is received from the completion time of the currently executing job, when (d) is less than the period of the first job, a value obtained by subtracting (d) from the period of the first job represents a time remaining until the start time of the first job, and when (d) is greater than the period of the first job: after obtaining a minimum n value where {the period of the first job−the execution time of the currently executing job+(n−1)×the period of the currently executing job} is greater than (d) (n is a natural number), a value obtained by subtracting (d) from {the period of the first job−the execution time of the currently executing job+(n−1)×the period of the currently executing job} represents a time remaining until the start time of the first job.

According to other features of these embodiments, he battery management method further includes, in order to be reflected in the performing of the synchronization of the job execution time, after receiving both the start signal and the completion signal of the job, calculating a reception error of the start signal of the job by comparing a difference between a time when the start signal is received and a time when the completion signal is received and the execution time stored in the time table.

Advantageous Effects

The present invention can perform the same job synchronization between each battery management system without additional configuration.

MODE FOR CARRYING OUT THE INVENTION

Figure 1:
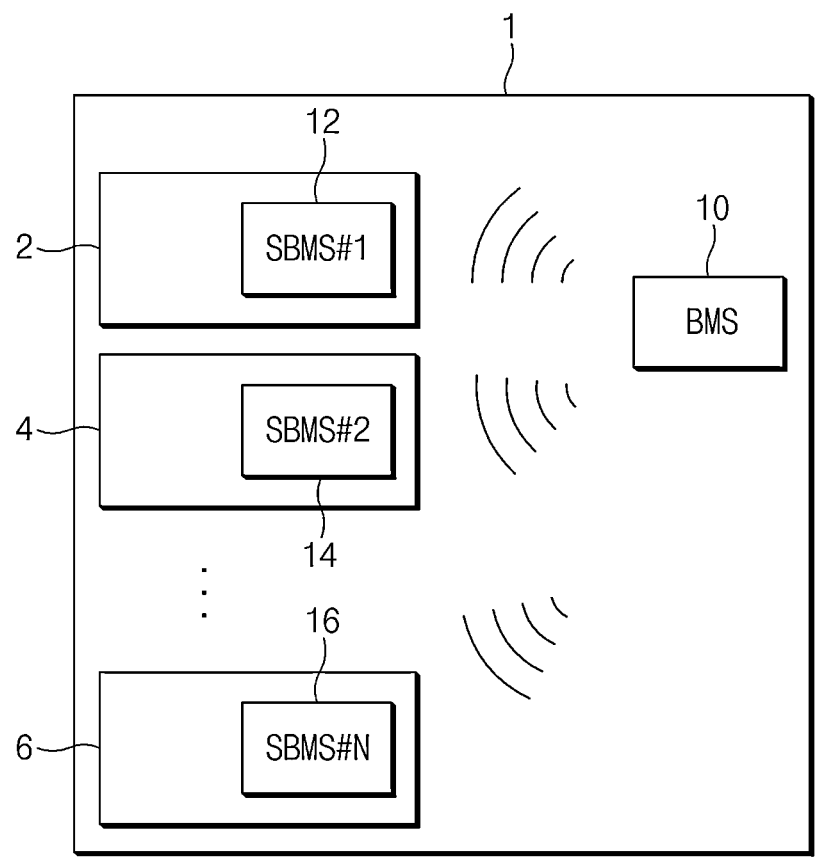
FIG. 1 is a configuration diagram of a battery pack including a battery management system according to an embodiment of the present invention.

Hereinafter, various embodiments of the present invention are disclosed with reference to the accompanying drawings. However, this is not intended to limit the invention to the specific embodiments, and it is to be understood that the invention includes various modifications, equivalents, and/or alternatives. With respect to the descriptions of the drawings, like reference numerals refer to like elements.

Terms used herein is for the purpose of describing particular example embodiments only and is not intended to be limiting of the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood as having an ideal or excessively formal meaning. In any cases, even the terms defined in this specification cannot be interpreted as excluding embodiments of the present invention.

In addition, in describing the components of the embodiment of the present invention, terms such as first, second, A, B, (a), and (b) may be used. These terms are only to distinguish the components from other components, and the nature, sequence, or order of the components are not limited by the terms. In addition, when a component is described as being "connected to", "coupled to" or "linked to" another component, the components may be directly connected to or linked to each other but it should be understood that other components may be "connected", "coupled", or "linked" between each component.

FIG. 1 is a configuration diagram of a battery pack including a battery management system according to an embodiment of the present invention.

A plurality of battery cells 2, 4, and 6 are connected to the battery pack 1 in series or in parallel. The slave battery management systems 12, 14, and 16 are disposed in the battery cells 2, 4, and 6, respectively. Each of the slave battery management system 12, 14, and 16 monitors by measuring the temperature, voltage or current of each of the plurality of battery cells 2, 4, and 6, transmits the monitored information to the high-level system, and receives control commands of the battery cells from the high-level system to control the connected battery cells.

The plurality of battery cells 2, 4, and 6 are connected in series or in parallel to form a battery pack 1. The battery pack 1 is provided with a master battery management system 10. The master battery management system 10 measures and monitors the temperature, voltage, or current of the battery pack 1. In addition, the master battery management system 10 receives monitoring information of each battery cell from the slave battery management systems 12, 14, and 16 disposed in the battery cells and transmits them to a high-level system, and receives a specific job execution command from the high-level system and transmits it to the corresponding slave battery management systems 12, 14 and 16.

At this time, signals between the battery management systems are transmitted and received wirelessly, and when the master battery management system 10 receives a specific job execution command from a high-level system and transmits it to the corresponding slave battery management system, signals may be delayed due to loss in air. At this time, it is necessary to perform synchronization in executing the same specific job in each corresponding slave battery management system. When designing a wireless network protocol, jobs of a system using the wireless network protocol are preset. In addition, due to the nature of the embedded, all functions must be performed within a fixed time, and should not exceed the fixed time. Under this premise, it is possible to synchronize job execution times for jobs between systems. When each job that each battery management system needs to execute is divided into functional units and each function is called one job, these jobs are determined during the embedded design stage of the battery management system, and depending on the performance of the selected IC, each job has an average execution time and a maximum execution time. Each system has jobs to be executed by each other and IDs for each system, and the maximum execution time and average execution time of these jobs have time tables for system-job-execution time. Each of the battery management systems transmits a signal for starting or completing a job in a broadcast (or multicast) to a system that needs to synchronize the start or completion time of the job.

Systems that receive a start or completion signal of a job by broadcasting may calculate a start time of a job that receives a start or completion signal using the job currently being executed by the system and the job where the start or completion signal was received by broadcasting, and the stored time table.

Accordingly, all battery management systems can calculate the job execution timing of each system, and execute the same job at the same time within the minimum error within the allowable range by synchronizing the timing of each job execution without additional configuration or separate control signals.

This will be described in more detail later.

Figure 2:
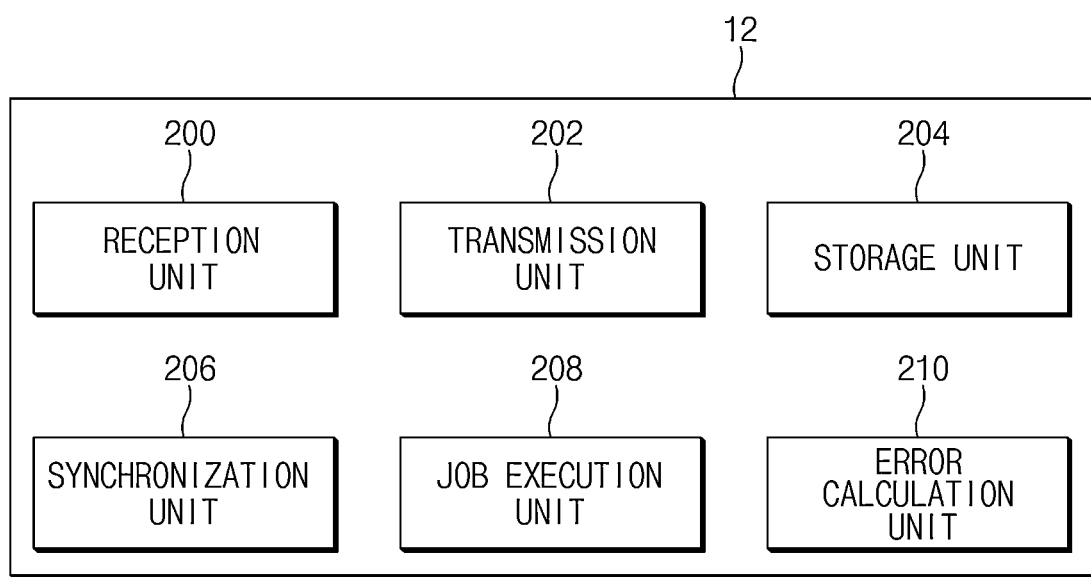
FIG. 2 is a configuration diagram of a battery management system according to an embodiment of the present invention.

FIG. 2 is a configuration diagram of a battery management system according to an embodiment of the present invention.

The battery management system may be a slave battery management system or a master battery management system. For this drawing, the slave battery management system 12 will be described as an example.

The slave battery management system 12 includes a reception unit 200, a transmission unit 202, a storage unit 204, a synchronization unit 206, a job execution unit 208, and an error calculation unit 210.

The reception unit 200 receives a specific job execution command from a high-level system. The high-level system can be a master battery management system. In addition, the reception unit 200 receives an execution start signal or completion signal of a specific job from another slave battery management system or a master battery management system. The reception unit 200 receives, for example, an execution start signal or completion signal of a specific job transmitted by broadcast or multicast.

When a specific job is started or completed in the job execution unit 208, the transmission unit 202 transmits a specific job start signal or completion signal in broadcast or multicast.

The storage unit 204 stores a time table including the execution job code of the corresponding slave battery management system 12, the execution priority of each execution job, the execution time of each execution job, and the period of each execution job.

The synchronization unit 206 calculates execution start time of a specific job using the execution start signal, completion signal, and time table of the specific job received from the reception unit 200 and synchronizes the corresponding job execution time between each system.

For example, when the reception unit 200 receives the execution start signal of the first job, the synchronization unit 206 determines whether the corresponding first job is included in the execution job on the time table. When the first job is included in the execution job on the time table, the slave battery management system 12 compares the priority with the currently executing job. When the priority of the first job is higher than the priority of the currently executing job, the slave battery management system stops the currently executing job and executes the first job first.

On the other hand, when the priority of the first job is lower than the priority of the currently executing job, the slave battery management system continues to execute the currently executing job and calculates the execution start time of the first job. The execution start time of the first job is calculated as follows:

(a) the reception time of the start signal of the first job;
(b) the time when the currently executing job is completed;
(c) time remaining until execution of the first job starts= ((b)−(a))/period of the first job;

That is, the execution start time of the first job can be calculated by using the time (c) to know how much has elapsed since the start of the first job, and based on this, the first job execution start time with other battery management systems can be synchronized.

In addition, when the reception unit 200 receives the execution completion signal of the first job, the synchronization unit 206 determines whether the corresponding first job is included in the execution job on the time table. When the first job is included in the execution job on the time table, the slave battery management system 12 compares the priority with the currently executing job. When the priority of the first job is higher than the priority of the currently executing job, the first job execution start time is calculated as follows:

(d) the completion signal reception time of the first job;
(e) the time when the currently executing job is completed;
(f) the time obtained by subtracting execution time from the first job period;
(g) time remaining until the execution of the first job starts=(f)−((e)−(d));

That is, the first job starts execution after (g) time, and must be started after the corresponding time to synchronize the first job execution start time with other battery management systems.

When the priority of the first job is lower than the priority of the currently executing job, the slave battery management system continues to execute the currently executing job and calculates the execution start time of the first job. The execution start time of the first job is calculated as follows:

(h) the completion signal reception time of the first job;
(i) the time when the currently executing job is completed;
(j) the value obtained by subtracting the completion signal reception time of the first job from the time when the currently executing job is completed=(i)−(h);
(k) when the period of the first job is greater than (j), [period of first job−(j)]=time remaining until execution of first job starts;
(l) when the period of the first job is less than (j), Find the smallest n value where the period of the first job−the execution time of the currently executing job+(n−1)×(the period of the first job) is greater than (j), and use the obtained n value,

[the period of the first job−the execution time of the currently executing job+(n−1)×(the period of the first job)]−(j)=time remaining until the execution of the first job starts;

The first job starts execution after the time k or the time l, and must be started after the corresponding time to synchronize the first job execution start time with other battery management systems.

The job execution unit 208 executes a plurality of jobs included in the time table stored in the storage unit 204 according to priority. However, for each job's execution start time, each job is executed according to the start time calculated by the synchronization unit 206. As a result, job execution time with other battery management systems executing the same job can be synchronized.

The error calculation unit 210 calculates an error using the start signal or completion signal reception time and time table of a specific job received at the reception unit. For example, the error is calculated using the difference between the start signal reception time and completion signal reception time and the difference in execution time of a specific job on the time table and is transmitted to the synchronization unit 206. When calculating the execution time of the first job, the synchronization unit 206 can calculate it by reflecting the calculated error.

Figure 3:
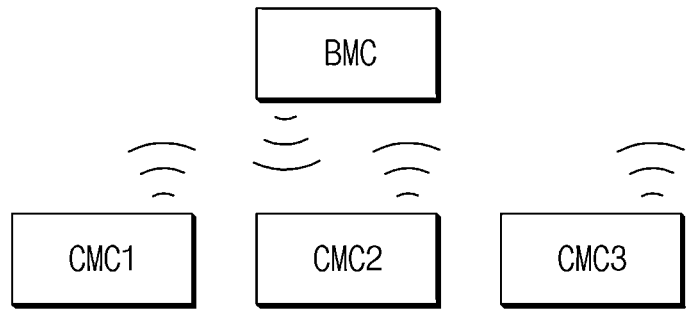
FIG. 3 shows an example of a time table of each battery management system according to an embodiment of the present invention.

FIG. 3 shows an example of a time table of each battery management system according to an embodiment of the present invention. The job executed by each battery management system is exemplarily described using a battery module controller (BMC) and a cell module controller (CMC). (each of BMC and CMC is called a node).

In the design stage on the embedded system, priority, execution time, and period for each job are determined as shown in the time table shown in FIG. 3. When all control units that receive the corresponding signal must execute the job at the same time due to the characteristics, the signal that the BMC indicates the job in batch is transmitted wirelessly, and there is a possibility that the signal is lost in the air. Therefore, when all BMCs or CMCs executing the same job are notified of the start of a specific job by broadcasting, due to some error, the node executing another job receives the corresponding signal and executes a job with a higher priority according to the priority, thereby increasing the stability of the system. In addition, since it is possible to know the starting time point of executing a specific job, it is possible to minimize errors in time synchronization that may occur between nodes.

For example, when the node CMC3 receives a signal that JOB A starts from the node CMC2 while JOB E is currently executing, after stopping the currently executing JOB E, it executes JOB A.

Also, for example, in the case where the node CMC2 is currently executing JOB A, and receives a signal that JOB B starts, when a value q obtained by subtracting the time o of receiving JOB B from the time p when JOB A is completed is divided by the period of JOB B, it is possible to know how much has elapsed from the execution period of JOB B. Based on this, the next start time of JOB B can be calculated.

Meanwhile, when a completion signal of a specific job is received by each node, execution start time of the job can be calculated using this.

For example, when the node CMC3 receives a signal that JOB A execution is completed from other nodes in a situation where JOB E is currently executing, the value t obtained by subtracting the reception time s of the execution completion signal of JOB A from the execution completion time r of currently executing JOB E is calculated. Subsequently, by subtracting t from the value u obtained by subtracting the execution time from the JOB A period, the start time of the next period of the JOB A can be calculated. Since JOB A can be executed after time v, all nodes can synchronize the execution time of JOB A.

In addition, for example, when the node CMC2 receives a signal that JOB B is completed from other nodes in a situation where JOB A is currently executing, the value y obtained by subtracting the reception time x of the completion signal of JOB B from the JOB A completion time w.

When y is smaller than the period of JOB B, the time that corresponds to the value obtained by subtracting y from the period may be calculated as the next start time of JOB B.

When y is greater than the period of JOB B, the smallest n value where period of JOB B−execution time of JOB A+(n−1)×period of JOB B is greater than y is calculated, The time of period of JOB B−execution time of JOB A+(n−1)×period of JOB B−(y)=(z) is calculated.

JOB B is executed after waiting a time z. Each node synchronizes the execution start time of JOB B by calculating the time z.

Furthermore, an error can be corrected using a start signal and a completion signal of a specific job received.

For example, when the node CMC1 receives the execution start signal and completion signal of JOB C, an error can be obtained by comparing the difference value and the execution time of the preset JOB C on the time table. The calculated error can be referred to when calculating the execution start time of JOB C. In this way, errors in synchronization can be minimized.

Figure 4:
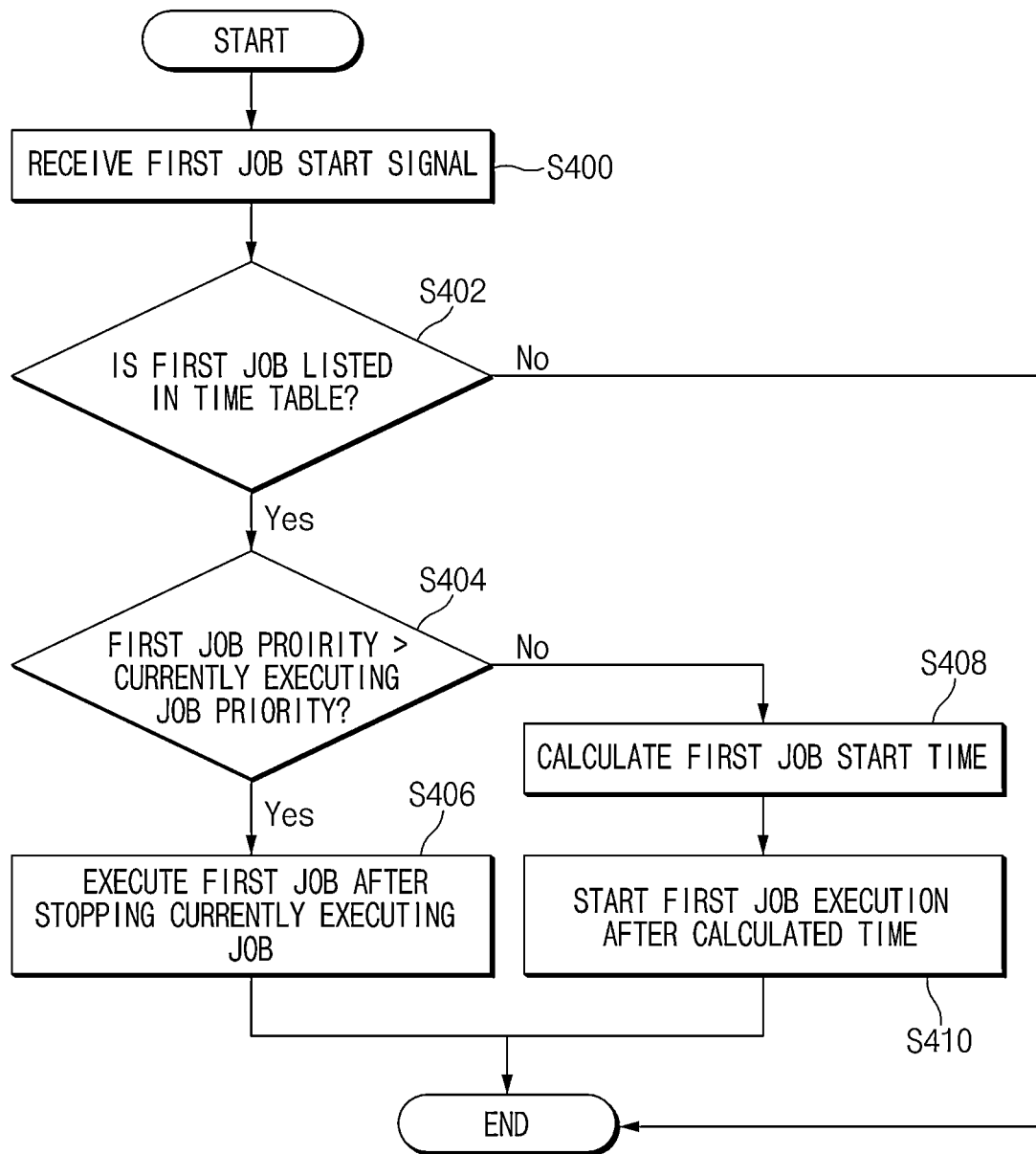
FIG. 4 is a flowchart of a method for synchronizing a job start time according to an embodiment of the present invention.

FIG. 4 is a flowchart of a method for synchronizing a job start time according to an embodiment of the present invention.

The reception unit 200 receives the execution start signal of the first job from another slave battery management system or the master battery management system (S400). The reception unit 200 receives, for example, an execution start signal or completion signal of a specific job transmitted by broadcast or multicast.

The synchronization unit 206 determines whether the first job is listed in the stored time table (S402). When the first job is listed on the execution job on the time table, it is determined whether the priority of the first job on the time table is high or the priority of the currently executing job is high (S404). When the priority of the first job is higher than the priority of the currently executing job, the slave battery management system stops the currently executing job and executes the first job first (S406).

On the other hand, when the priority of the first job is lower than the priority of the currently executing job, the slave battery management system continues to execute the currently executing job and calculates the execution start time of the first job (S408).

The execution start time of the first job is calculated as follows:

(a) the reception time of the start signal of the first job;
(b) the time when the currently executing job is completed;
(c) time remaining until execution of the first job starts= ((b)−(a))/cycle of the first job;

That is, the execution start time of the first job can be calculated by using the time (c) to know how much has elapsed since the start of the first job, and based on this, the first job execution start time with other battery management systems can be synchronized.

After the calculated time, execution of the first job is started (S410).

Figure 5:
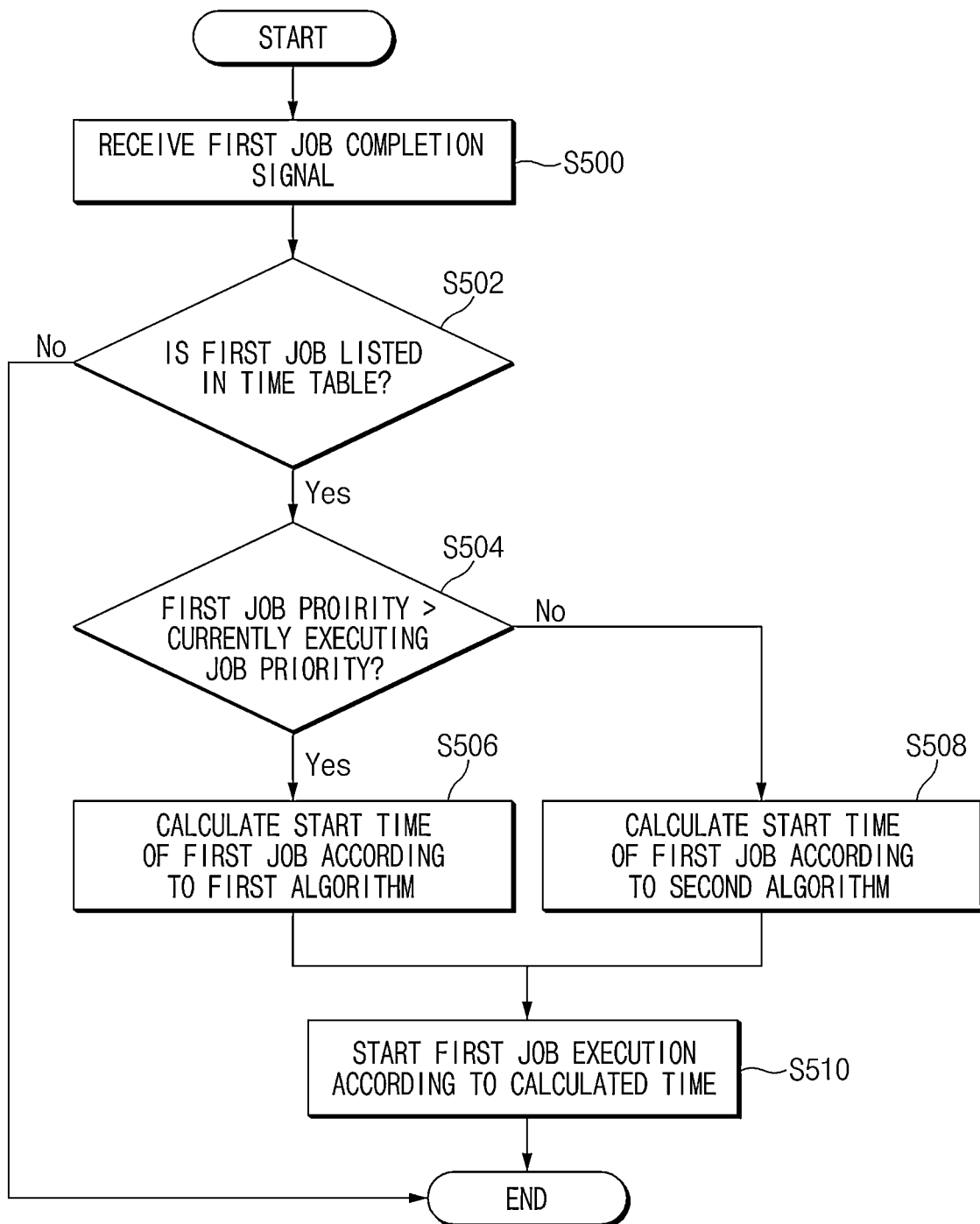
FIG. 5 is a flowchart of a method for synchronizing a job start time according to another embodiment of the present invention.

FIG. 5 is a flowchart of a method for synchronizing a job start time according to another embodiment of the present invention.

The reception unit 200 receives an execution completion signal of the first job (S500). The reception unit 200 receives a first job execution completion signal received by broadcast.

When the reception unit 200 receives the execution completion signal of the first job, the synchronization unit 206 determines whether the first job is listed in the execution job on the time table (S502).

When the first job is listed as an execution job on the time table, the slave battery management system 12 compares the priority with the currently executing job (S504).

When the priority of the first job is higher than the priority of the currently executing job, the first job execution start time is calculated according to the first algorithm as follows (S506):

(d) the completion signal reception time of the first job;
(e) the time when the currently executing job is completed;
(f) the time obtained by subtracting the execution time from the period of the first job;
(g) time remaining until execution of the first job starts= (f)−((e)−(d));

That is, the first job is started after (g) time, and must be started after the corresponding time to synchronize the first job execution start time with other battery management systems.

Subsequently, execution of the first job is started according to the calculated time (S510).

On the other hand, when the priority of the first job is lower than the currently executing job, the slave battery management system continuously executes the currently executing job, and calculates the execution start time of the first job according to the second algorithm (S508). The execution start time of the first job according to the second algorithm is calculated as follows:

(h) the completion signal reception time of the first job;
(i) the time when the currently executing job is completed;
(j) the value obtained by subtracting the completion signal reception time of the first job from the time when the currently executing job is completed=(i)−(h);
(k) when the period of the first job is greater than (j),
[period of first job−(j)]=time remaining until execution of first job starts;
(l) when the period of the first job is smaller than (j),
Find the smallest n value where the period of the first job−the execution time of the currently executing job+(n−1)×(the period of the first job) is greater than (j), and use the obtained n value,

[the period of the first job−the execution time of the currently executing job+(n−1)×(the period of the first job)]−(j)=time remaining until the execution of the first job starts;

The first job starts execution after the time k or the time l, and must be started after the corresponding time to synchronize the first job execution start time with other battery management systems.

Subsequently, execution of the first job is started according to the calculated time (S510).

Figure 6:
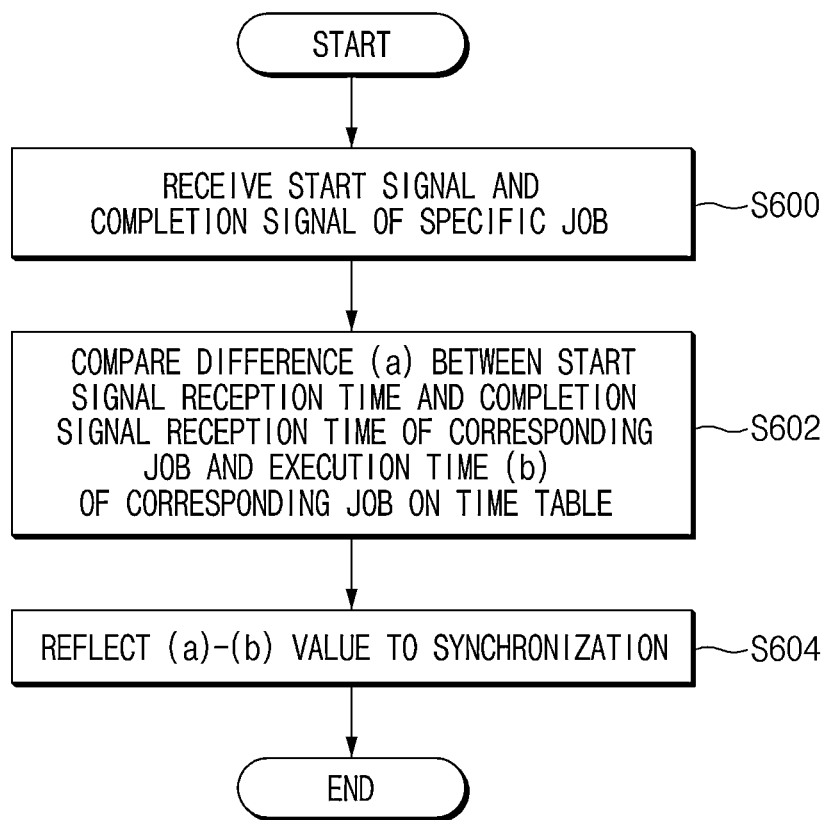
FIG. 6 is a flowchart of synchronization error correction according to an embodiment of the present invention.

FIG. 6 is a flowchart of synchronization error correction according to an embodiment of the present invention.

The reception unit 200 receives a start signal and a completion signal of a specific job (S600).

The difference between the start signal reception time of the job and the completion signal reception time is compared with the execution time of the job on the time table (S602). The error calculation unit 210 calculates an error using the start signal or completion signal reception time and time table of a specific job received at the reception unit. For example, the error is calculated using the difference between the start signal reception time and completion signal reception time and the difference in execution time of a specific job on the time table and is transmitted to the synchronization unit 206.

The synchronization unit 206 receiving the error value reflects the error value in executing time synchronization of a specific job (S604).

Figure 7:
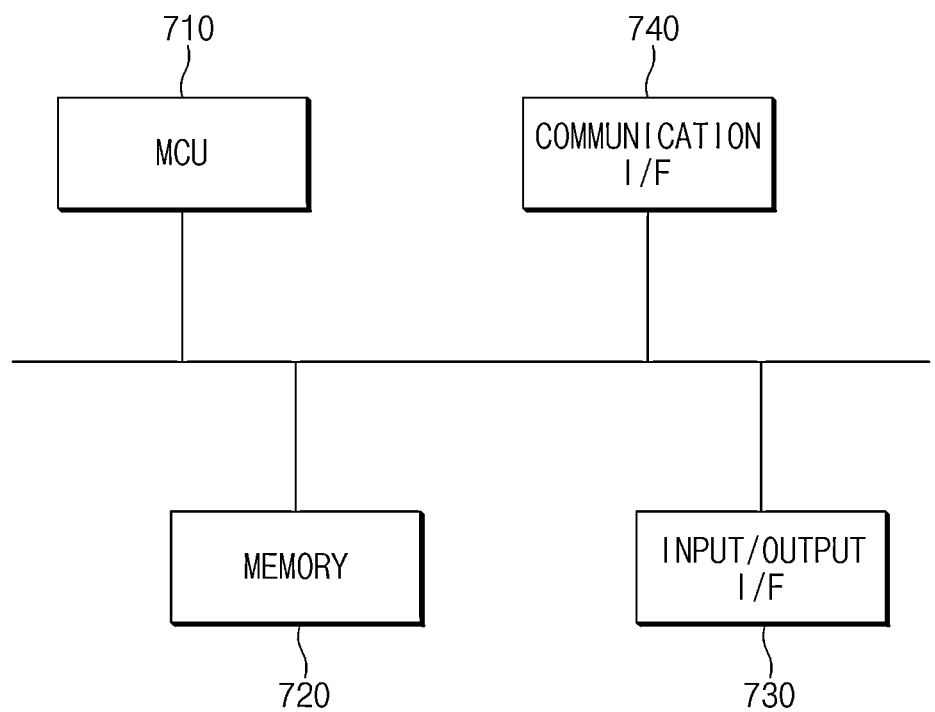
FIG. 7 is a block diagram illustrating a hardware configuration of a battery management system according to an embodiment of the present invention.

FIG. 7 is a block diagram illustrating a hardware configuration of a battery management system according to an embodiment of the present invention.

A battery management system 700 may include a microcontroller (MCU) 710 for controlling various processes and components, a memory 720 in which an operating system program and various programs (e.g., a battery pack abnormality diagnosis program or a battery pack temperature estimation program) are recorded, an input/output interface 730 providing an input interface and an output interface between the battery cell module and/or the semiconductor switching element, and a communication interface 740 capable of communicating with the outside through a wired/wireless communication network. As described above, the computer program according to the present invention may be recorded in the memory 720 and processed by the microcontroller 710 to be implemented as a module for performing the respective functional blocks shown in FIG. 2.

Reference herein to 'one embodiment' of the principles of the present invention and various modifications of such expressions means that, in relation to this embodiment, the specific features, structures, characteristics, and the like are included in at least one embodiment of the principles of the present invention. Thus, the expression 'in one embodiment' and any other modifications disclosed throughout the specification are not necessarily all referring to the same embodiment.

All the embodiments and conditional examples disclosed in this specification are described to intend to help those skilled in the art to understand the principles and concepts of the present invention, so that it will be understood by those skilled in the art that various changes in form and details may be made therein without departing from the spirit and scope of the present invention. Therefore, the disclosed embodiments should be considered in descriptive sense only not in limited perspective sense. The scope of the invention is defined not by the detailed description of the invention but by the appended claims, and all differences within the scope will be construed as being included in the present invention.

The invention claimed is:

1. A battery management systems, comprising:
a reception unit configured to receive a start signal and a job completion signal from another battery management system;
a transmission unit configured to transmit the start signal and the job completion signal by broadcast;
a storage unit configured to store a time table including a job code of a plurality of jobs to be executed, a priority of a corresponding job, and an execution time and period of the corresponding job;
a synchronization unit configured to execute synchronization of a job execution time using the received start signal or the received job completion signal and the time table; and
a job execution unit configured to execute a job using the time table stored in the storage unit and a time calculated by the synchronization unit.

2. The battery management system of claim 1, wherein:
when the job is a first job and the reception unit receives the start signal of the first job, and when the first job has a higher priority than a currently executing job that is a job executed by the job execution unit based on the time table stored in the storage unit, the synchronization unit is further configured to allow the job execution unit to stop the currently executing job and execute the first job; and
when the first job has a lower priority than the currently executing job, the synchronization unit is further configured to calculate a next start time of the first job using a time when the start signal of the first job is received and a completion time of the currently executing job so that the execution unit executes the first job at the next start time.

3. The battery management system of claim 2, wherein, when the first job has a lower priority than the currently executing job, a time elapsed by a time, which is calculated by dividing a value obtained by subtracting the time when the start signal of the first job is received from the completion time of the currently executing job by the period of the first job, is the next start time.

4. The battery management system of claim 1, wherein, when the job is a first job and the reception unit receives theme completion signal of the first job:
when the first job has a higher priority than the currently executing job that is the job executed by the job execution unit based on the time table stored in the storage unit, the synchronization unit is further configured to:
calculate:
the next start time of the first job using a time when the job completion signal of the first job is received;
a completion time of the currently executing job; and
the execution time and the period of the first job; and
allow the execution unit to execute the first job at the next start time; and
when the first job has a lower priority than the currently executing job, the synchronization unit is further configured to calculate the start time of the first job using the difference value between the time when the job completion signal of the first job is received and the completion time of the currently executing job and the period of the first job to cause the execution unit to execute the first job at the start time of the first job.

5. The battery management system of claim 4, wherein, when the first job has a higher priority than the currently executing job, a value (c)(=(a)−(b)), which is a value obtained by subtracting (b) that is a value obtained by subtracting the time when the job completion signal of the first job is received from the completion time of the currently executing job from (a) that is a value obtained by subtracting the execution time of the first job from the period of the first job, is determined to be a remaining time until the next start time of the first job.

6. The battery management system of claim 4, wherein, when the first job has a lower priority than the currently executing job, by comparing the period of the first job with (d), which is a value obtained by subtracting the time when the job completion signal of the first job is received from the completion time of the currently executing job:
  when (d) is less than the period of the first job, a value obtained by subtracting (d) from the period of the first job represents a time remaining until the start time of the first job; and
  when (d) is greater than the period of the first job, after obtaining a minimum n value where {the period of the first job−the execution time of the currently executing job+(n−1)×the period of the currently executing job} is greater than (d) (n is a natural number), a value obtained by subtracting (d) from {the period of the first job−the execution time of the currently executing job+(n−1)×the period of the currently executing job} represents a time remaining until the start time of the first job.

7. The battery management system of claim 1, further comprising an error calculation unit configured to calculate a reception error of the start signal of the job by comparing a difference between a time when the start signal is received and a time when the job completion signal is received and the execution time stored in the time table, after the reception unit receives both the start signal and the job completion signal,
  wherein the synchronization unit is further configured to reflect the reception error in synchronization.

8. A battery management method, comprising:
  receiving a start signal and a job completion signal;
  performing synchronization of a job execution time based on the received start signal or the received job completion signal, and a time table stored in a storage unit the time table comprising a job code of a plurality of jobs to be executed, a priority of a corresponding job, and an execution time and period of the corresponding job; and
  executing a job using the time table and the job execution time calculated from the job execution synchronization.

9. The battery management method of claim 8, wherein, when the job is a first job and the start signal of the first job is received, the performing of the synchronization of the job execution time comprises:
  when the first job has a higher priority than the currently executing job, which is a job that is being executed currently, based on the time table, stopping the currently executing job and executing the first job; and
  when the first job has a lower priority than the currently executing job based on the time table, calculating a next start time of the first job by using a time when the start signal of the first job is received and a completion time of the currently executing job, to execute the first job at the next start time.

10. The battery management method of claim 9, wherein, when the first job has a lower priority than the currently executing job, a time elapsed by a time, which is calculated by dividing a value obtained by subtracting the time when the start signal of the first job is received from the completion time of the currently executing job by the period of the first job, is a next start time.

11. The battery management method of claim 8, wherein, when the job is a first job and the job completion signal of the first job is received, the performing of the synchronization of the job execution time comprises:
  when the first job has a higher priority than the currently executing job that is a job that is being executed current based on the time table, calculating the next start time of the first job using the time when the job completion signal of the first job is received, the completion time of the currently executing job, and the execution time and the period of the first job to execute the first job at the next start time; and
  when the first job has a lower priority than the currently executing job, calculating the start time of the first job using the difference value between the time when the job completion signal of the first job is received and the completion time of the currently executing job and the period of the first job to execute the first job at the start time of the first job.

12. The battery management method of claim 11, wherein, when the first job has a higher priority than the currently executing job, a value (c)(=(a)−(b)), which is a value obtained by subtracting (b) that is a value obtained by subtracting the time when the job completion signal of the first job is received from the completion time of the currently executing job from (a) that is a value obtained by subtracting the execution time of the first job from the period of the first job, is determined to be a remaining time until the next start time of the first job.

13. The battery management method of claim 11, wherein, when the first job has a lower priority than the currently executing job, by comparing the period of the first job with (d), which is a value obtained by subtracting the time when the job completion signal of the first job is received from the completion time of the currently executing job:
  when (d) is less than the period of the first job, a value obtained by subtracting (d) from the period of the first job represents a time remaining until the start time of the first job; and
  when (d) is greater than the period of the first job, after obtaining a minimum n value where {the period of the first job−the execution time of the currently executing job+(n−1)×the period of the currently executing job} is greater than (d) (n is a natural number), a value obtained by subtracting (d) from {the period of the first job−the execution time of the currently executing job+(n−1)×the period of the currently executing job} represents a time remaining until the start time of the first job.

14. The battery management method of claim 8, further comprising, to be reflected in the performing of the synchronization of the job execution time, after receiving both the start signal and the job completion signal of the job, calculating a reception error of the start signal of the job by comparing a difference between a time when the start signal is received and a time when the job completion signal is received and the execution time stored in the time table.

* * * * *